United States Patent
Jain et al.

(10) Patent No.: US 11,144,500 B2
(45) Date of Patent: *Oct. 12, 2021

(54) ASSIGNMENT OF DATA WITHIN FILE SYSTEMS

(71) Applicant: International Business Machines Corporation, Armonk, NY (US)

(72) Inventors: Uttam Jain, San Jose, CA (US); Nimrod Megiddo, Palo Alto, CA (US); Umar F. Minhas, San Jose, CA (US); Fatma Ozcan, San Jose, CA (US); Robbert Van Der Linden, Scotts Valley, CA (US)

(73) Assignee: International Business Machines Corporation, Armonk, NY (US)

( * ) Notice: Subject to any disclaimer, the term of this patent is extended or adjusted under 35 U.S.C. 154(b) by 364 days.

This patent is subject to a terminal disclaimer.

(21) Appl. No.: 16/151,373

(22) Filed: Oct. 4, 2018

(65) Prior Publication Data

US 2019/0034444 A1 Jan. 31, 2019

Related U.S. Application Data

(63) Continuation of application No. 14/974,477, filed on Dec. 18, 2015, now Pat. No. 10,127,237.

(51) Int. Cl.
*G06F 12/00* (2006.01)
*G06F 16/13* (2019.01)
*G06F 16/182* (2019.01)

(52) U.S. Cl.
CPC .......... *G06F 16/137* (2019.01); *G06F 16/182* (2019.01)

(58) Field of Classification Search
CPC .... G06F 16/137; G06F 3/0646; G06F 3/0689; G06F 3/0635; G06F 3/0613
See application file for complete search history.

(56) References Cited

U.S. PATENT DOCUMENTS

| | | | |
|---|---|---|---|
| 8,543,596 B1 | 9/2013 | Kostamaa et al. | |
| 10,127,237 B2* | 11/2018 | Jain | G06F 16/182 |
| 2003/0176931 A1* | 9/2003 | Pednault | G06K 9/6282 |
| | | | 700/31 |

(Continued)

FOREIGN PATENT DOCUMENTS

WO 2008118613 10/2008

OTHER PUBLICATIONS

Mohandas et al., "Improving Hadoop Performance in Handling Small Files", ACC 2011, Part IV, CCIS 193, pp. 187-194, 2011.

(Continued)

*Primary Examiner* — Azam M Cheema
(74) *Attorney, Agent, or Firm* — Lieberman & Brandsdorfer, LLC (57) ABSTRACT

The embodiments relate to assigning data to processors of a file system. Metadata associated with respective blocks of data, and an initial batch of the blocks is assigned to nodes of a file system based on the metadata. Unassigned blocks are selectively assigned to one or more of the nodes. The selective assignment includes constructing a linear regression model based on node data, and determining a value for each node based on the linear regression model. Each value is associated with a predicted load corresponding to a new assignment of one or more unassigned blocks.

18 Claims, 8 Drawing Sheets

(56) References Cited

U.S. PATENT DOCUMENTS

| | | | |
|---|---|---|---|
| 2012/0323864 A1* | 12/2012 | Zhu | .................... H04L 67/10 |
| | | | 707/692 |
| 2013/0180040 A1 | 7/2013 | Baumann | |
| 2014/0047422 A1 | 2/2014 | Ravi et al. | |
| 2014/0059310 A1 | 2/2014 | Du et al. | |
| 2014/0156777 A1 | 6/2014 | Subbiah et al. | |
| 2014/0222871 A1 | 8/2014 | Qi et al. | |
| 2014/0372611 A1 | 12/2014 | Matsuda et al. | |
| 2015/0180909 A1* | 6/2015 | Nakamatsu | ......... H04L 65/1046 |
| | | | 370/230 |
| 2016/0179581 A1 | 6/2016 | Soundararajan et al. | |

OTHER PUBLICATIONS

Vijayakumari et al., "Comparative analysis of Google File System and Hadoop Distributed File System", International Journal of Advanced Trends in Computer Science and Engineering, vol. 3, No. 1, pp. 553-558 (2014).
List of IBM Patents or Applications Treated as Related, Oct. 2018.

* cited by examiner

FIG. 8

ASSIGNMENT OF DATA WITHIN FILE SYSTEMS

CROSS-REFERENCE TO RELATED APPLICATION

The present application is a continuation patent application claiming the benefit of U.S. patent application Ser. No. 14/974,477, filed on Dec. 18, 2015, and titled "Assignment of Data Within File Systems" now pending, the entire contents of which are hereby incorporated by reference.

BACKGROUND

The embodiments described herein relate generally to file systems. More specifically, the embodiments described herein relate to assigning data to processors of a file system.

A file system is a term of art to refer to structure and logic rules for managing data. Specifically, file systems are used to control how data is stored, retrieved, and updated. One type of file system is a distributed file system (DFS), in which multiple copies of each data item are stored in different locations. A DFS may be used in scenarios in which high-performance data analytics is required over large datasets.

Queries are typically issued using a structured format called Structured Query Language (SQL), and allow running of SQL queries over data stored in the DFS. A component of such DFS, referred to herein as a scheduler, assigns work to SQL processors of the DFS, also referred to herein as workers. Specifically, the DFS splits the files into fixed-size blocks, and distributes the blocks throughout the DFS by assigning data to respective worker nodes ("nodes") via the scheduler. In one embodiment, the data are splits of tables, or splits. Splits are assigned to nodes by utilizing a "split-assignment method." A goal of such a method is to assign splits to nodes while optimizing data locality (i.e., assign splits to processors where data resides, to avoid remote data reading) and achieving load balance and efficiency (i.e., assign splits evenly to all workers). Existing methods employ a so-called greedy algorithm, which provides best-effort locality (i.e., remote reading of data is avoided, if possible). The greedy algorithm assumes that DFS data is distributed more or less uniformly among available nodes, and does not consider past-performance statistics. As a result, the greedy algorithm frequently produces a low quality assignment resulting in poor query performance, when one or both of these assumptions are violated.

SUMMARY

The aspects described herein include a method, a system, and a computer program product for assigning data blocks to nodes of a distributed file system.

According to one aspect, a method is provided for assigning blocks of data to nodes of a file system. An initial batch of the blocks is assigned to nodes of the file system based on gathered metadata. Unassigned blocks are selectively assigned to one or more of the nodes. This selective assignment includes constructing a linear regression model based on node data, and determining a value for each node based on the linear regression model. Each value is associated with a predicted value corresponding to a new assignment of one or more unassigned blocks. A control factor associated with the selective assignment is adjusted, and a second assignment circuit to the nodes is performed with the adjusted control factor.

According to another aspect, a computer program product is provided to assign blocks of data to nodes of a file system. The computer program product includes a computer-readable storage medium having program code embodied therewith. The program code is executable by a processing unit to assign an initial batch of the blocks to nodes of a file system based on gathered metadata. Program code selectively assigns unassigned blocks to one or more of the nodes. This selective assignment includes program code to construct a linear regression model based on node data, and determine a value for each node based on the linear regression model. Each value is associated with a predicted load corresponding to a new assignment of one or more unassigned blocks. In addition, program code adjusts a control factor associated with the selective assignment, and performs a second assignment circuit to the nodes with the adjusted control factor.

According to yet another aspect, a system is provided to assign blocks of data to nodes of a file system. The system includes a processing unit in communication with memory, a plurality of nodes each having local persistent storage, a local processor, and a tool in communication with the nodes. The tool is configured to assign an initial batch of the blocks to the nodes based on gathered metadata, and selectively assigns unassigned blocks to one or more of the nodes. This selective assignment utilizes a constructed linear regression model based on node data, and the tool to determine a value for each node based on the linear regression model. Each value is associated with a predicted load corresponding to a new assignment of one or more unassigned blocks. In addition, the tool adjusts a control factor associated with the selective assignment, and performs a second assignment circuit to the nodes with the adjusted control factor.

Other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not all embodiments, unless otherwise explicitly indicated.

DETAILED DESCRIPTION

It will be readily understood that the components of the embodiments described herein, as generally described and illustrated in the Figures herein, may be arranged and designed in a wide variety of different configurations. Thus, the following detailed description of the embodiments of the method, computer program product, and system, as presented in the Figures, is not intended to limit the scope of the claims, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments described herein will be best understood by reference to the drawings, wherein like parts are designated by like numerals throughout. The following description is intended only by way of example, and simply illustrates certain selected embodiments of devices, systems, and processes that are consistent with the claims herein.

Data blocks are assigned to nodes of a file system for processing. An initial batch of assignments is distributed among the nodes for processing. The initial batch does not include all of the data assignments. The remaining data blocks, also referred to herein as unassigned data blocks, are selectively distributed among the nodes. Specifically, the remaining data blocks are assigned in stages that, in one embodiment, may take place parallel with the processing of the data blocks of the initial batch. This parallel processing functionality supports intelligent selective assignment decisions by taking into account statistical data derived from the processing of previously assigned data blocks. Accordingly, the selective assignment process may be dynamically controlled.

Figure 1:
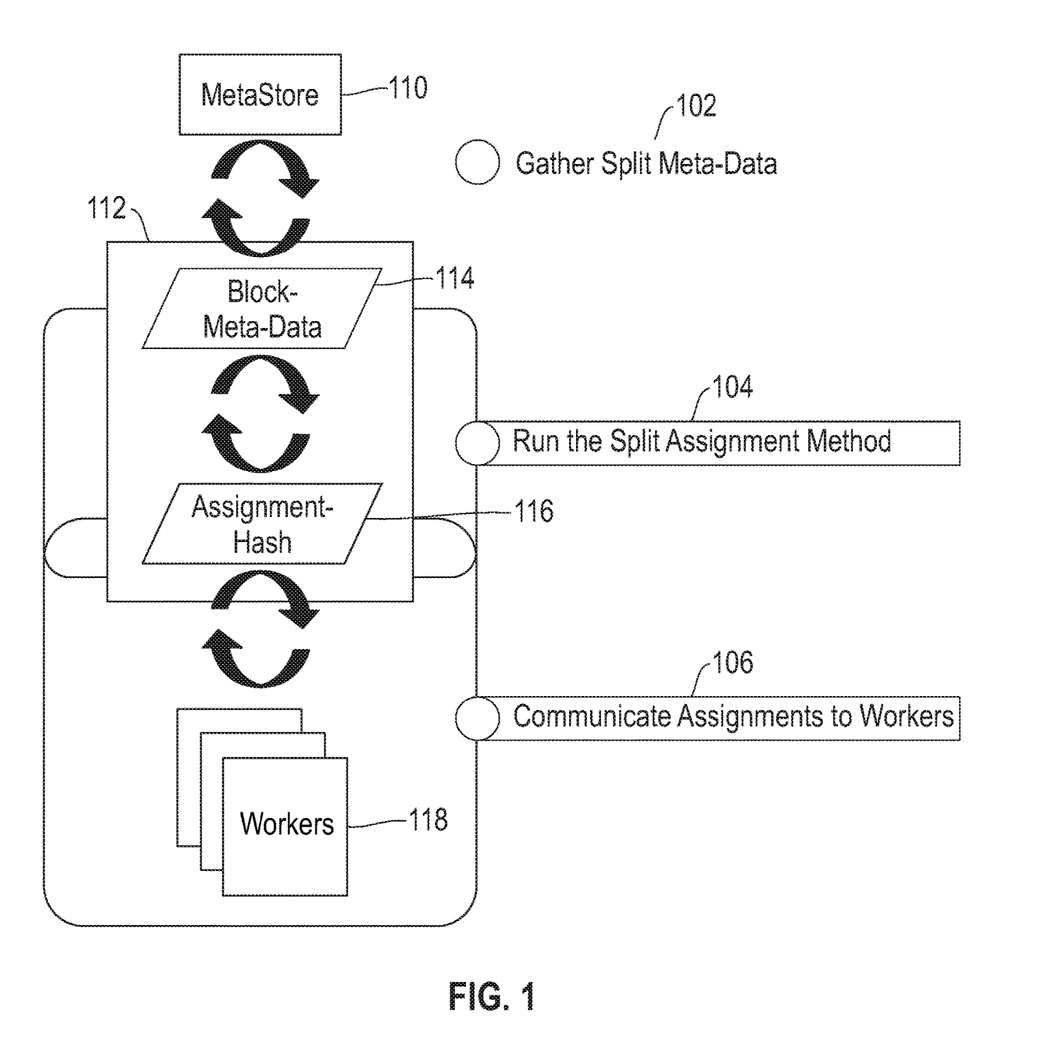
FIG. 1 depicts a block diagram illustrating an overview of stages of a data assignment method.

Referring to FIG. 1, a block diagram (100) is provided illustrating an overview of stages of a data assignment process within a file system. In one embodiment, the file system is a distributed file system. As shown, there are three stages of the data assignment process, including a first stage (102), a second stage (104), and a third stage (106). The first stage (102) is associated with gathering metadata corresponding to data blocks. In one embodiment, the data blocks are splits of tables, also referred to herein as splits. The gathered metadata may include metadata such as name, location, size, etc. about the respective data blocks. In one embodiment, the metadata may be gathered from an external source (110) that stores and serves metadata. As shown, external source (110) is a metadata store ("MetaStore"). However, in alternative embodiments, other external sources may be implemented. Examples of such other external sources include, but are not limited to, a NameNode, shard directory, etc. The gathered metadata is populated into a data structure, block metadata (114), of data structure collection (112).

The second stage (104) is associated with a data assignment method. The gathered metadata from the second stage (102) is processed, and split assignments to worker nodes of the file system are determined based on the processed metadata. In one embodiment, a live worker node list is provided by an external coordinator service (not shown) that monitors the state of live worker nodes in the file system, and the splits are assigned to the live worker nodes. The data assignments are populated in a data structure (116) of the data structure collection (112). In one embodiment, and as shown, the data structure (116) is an assignment hash data structure. The assignment hash data structure (116) stores the list of assigned splits, with each assigned split being hashed by a respective key. In one embodiment, each key is a worker-node-number, which is a unique identifier assigned to each worker in the system.

The third stage (106) is associated with the communication of the split assignments to workers (118). Further details with respect to the split assignment method will be discussed below with reference to FIGS. 2-4.

In one embodiment, the stages (102)-(106) of the process described in FIG. 1 are configured to run in a dynamic or parallelized fashion. Specifically, the second stage (104) can begin processing of the metadata as soon as the metadata gathered in the first stage (102) is made available, and the third stage (106) can begin communicating the assignments to the worker nodes as soon as the assignments made during the second stage (104) are made available. In other words, the process of FIG. 1 may be implemented as a streaming mechanism that allows the stages to overlap. Accordingly, pipelining between stages may be achieved to reduce latency and improve the overall efficiency of the split assignment process.

Figure 2:
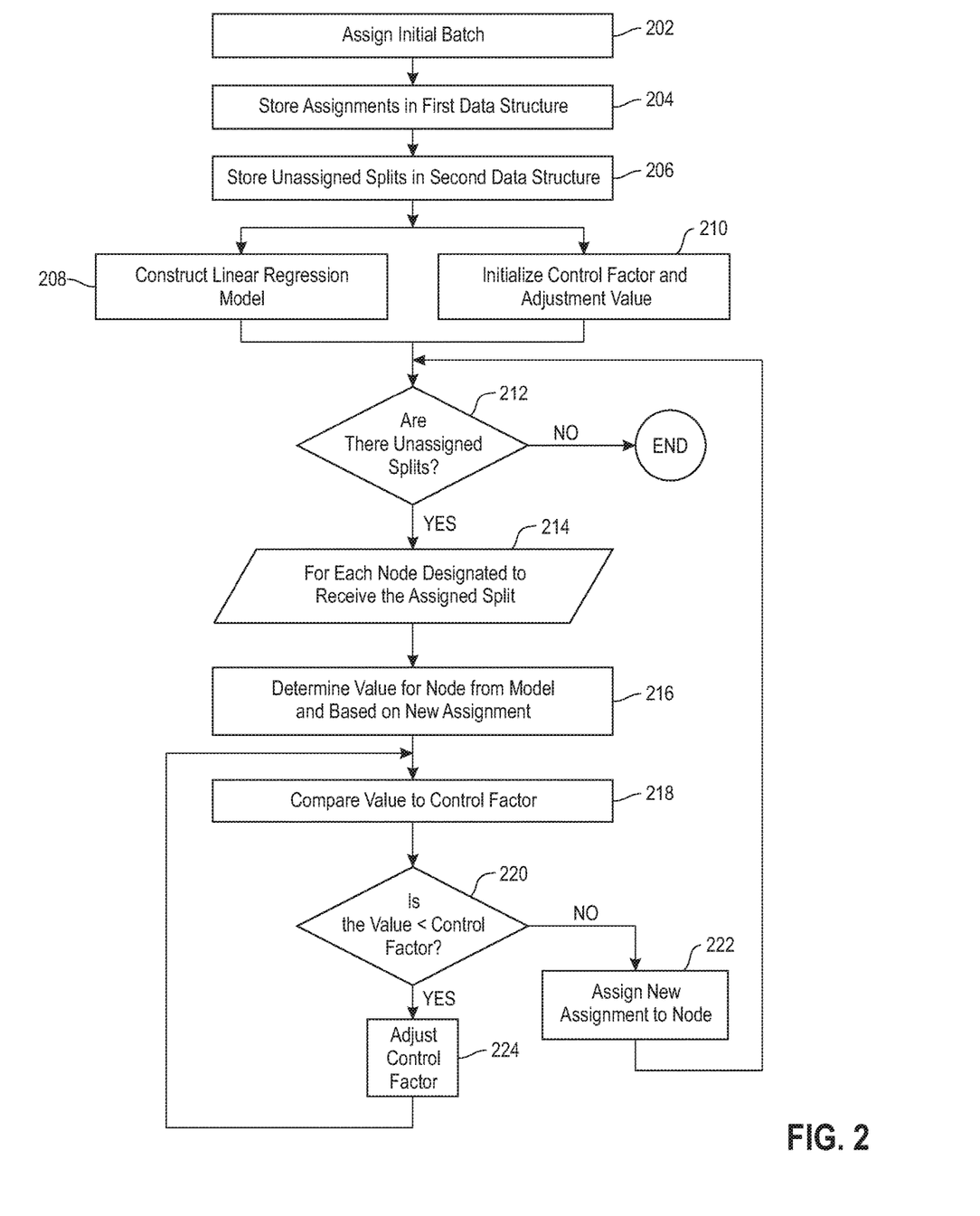
FIG. 2 depicts a flow chart illustrating a process for assigning data to workers of a file system.

FIG. 2 depicts a flow chart (200) illustrating a process for assigning data to worker nodes of a file system. An initial batch of data blocks is assigned to nodes of a file system (202). In one embodiment, the assignment at step (202) includes processing gathered metadata, and assigning the data of the initial batch locally to live worker nodes based on the processed metadata and a received live worker node list, as discussed above with reference to FIG. 1. The initial batch of data blocks may be a fixed number of data blocks and, due to time considerations, in one embodiment are assigned at step (202) relatively quickly.

Each assignment of the initial batch may be stored in a first data structure (204). In one embodiment, the first data structure is an assignment hash data structure, as described above with reference to FIG. 1. The splits that have not been assigned as part of the initial batch are referred to as unassigned splits. In one embodiment, the unassigned splits may be stored in a second data structure (206). For example, the unassigned splits may be stored at step (206) as a linked list of splits. After the initial assignment at step (202), the unassigned splits are processed for selective assignment.

A linear regression model associated with the worker nodes of the file system is constructed based on node data (208). Specifically, the linear regression model is used to "predict" how a potential new assignment may affect a load of the node. In one embodiment, the load is associated with a time to process the assignment, or work time, at the node. In one embodiment, work time pertains to how much time it will take a node under consideration to process X local splits and Y remote splits. Statistics are collected on a node basis, and as such the statistics provide data indicating time required to process a split, either local or remote. The new assignment may include local split assignments and/or remote split assignments. For example, the linear regression model may provide answers to questions such as "By how much would the load at this node increase if X local or Y remote data blocks were assigned to this node?" In one embodiment, when the algorithm assesses an assignment of local and remote splits, the cost of one local split is multiplied by a local split factor and the cost of one remote split is multiplied by a remote split factor, and the estimated cost is the addition of these two products. Accordingly, the linear regression model represents the predictive effect that a new assignment will have on each node of the file system.

Figure 3:
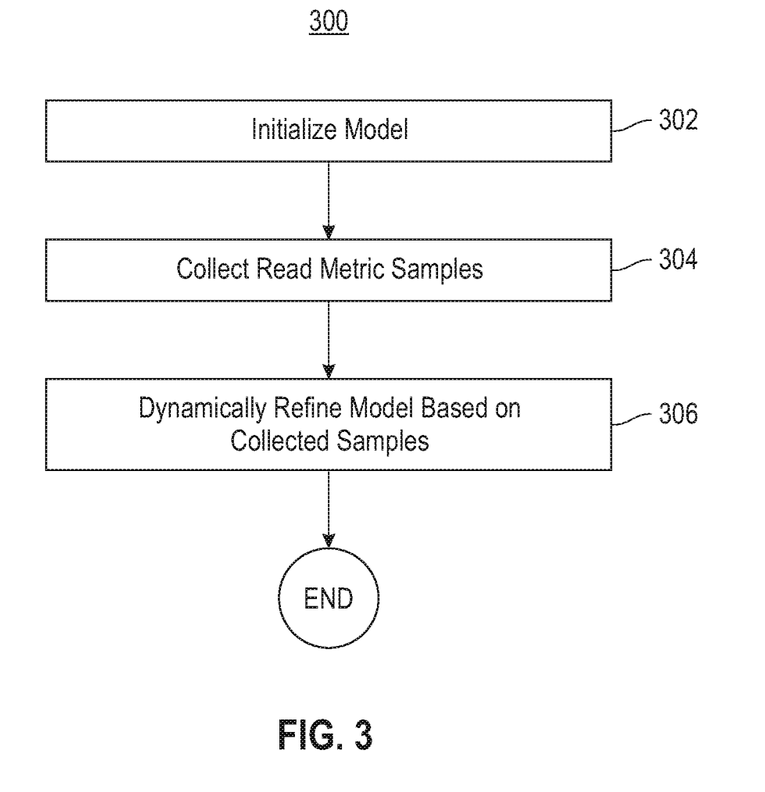
FIG. 3 depicts a flow chart illustrating a process for fitting a linear regression model implemented in the process of FIG. 2.

Referring now to FIG. 3, a flow chart (300) is provided illustrating an exemplary process for constructing a linear regression model. A linear regression model is initialized based on a set of initial values (302). In one embodiment, the set of initial values are associated with approximate cost estimates. During the running of a split assignment process, read metric samples for each node are collected (304). In one embodiment, the read metric samples comprise node statistics that are collected on a per worker basis. Node statistics for a given node include, for example, a number of local reads, a number of remote reads, and a total time it takes to process data blocks. This information is used to derive a predictive effect of a new assignment on each node. The linear regression model is dynamically refined based on the collected samples (306). For example, once a sufficient number of samples have been accumulated, the linear regression model may be refined in response to each sample collected. In other words, the linear regression model need not be constructed or generated upon collection of a new sample. In one embodiment, the refinement at step (306) includes employing a decay factor governing a relative weight between past samples and each new sample. That is, the decay factor controls the impact that each new sample will have on the linear regression model. Accordingly, a linear regression model is initialized, and is dynamically adjusted based on data samples collected from the nodes.

Referring back to FIG. 2, a control factor and a control factor adjustment value ("adjustment value") are initialized (210). The control factor functions as a bound during the selective assignment process by setting a maximum permitted worker load per node. In one embodiment, the control factor is referred to as a global bound. In one embodiment, the higher the control factor, the greater the bound on the permitted worker load per node. As will be discussed in further detail below, the selective assignment process occurs in "circuits." If there are any remaining unassigned splits after a circuit, the adjustment value increases the control factor. Accordingly, the selective assignment process takes into account the load on nodes of the file system.

In a distributed file system, a single file may be "split-up" into multiple blocks, where each block is of fixed size (e.g. 64 MB or 128 MB). These blocks are then distributed among the nodes hosting the file system according to some policy. "Split" and block are interchangeable and refer to one such block of a larger file. Every split may be hosted by P number of nodes. P is largely determined by the replication factor, which in one embodiment is set to three. Every split is replicated as a set by the replication factor to that quantity of system nodes. At any given time, there may be Q number of live worker nodes which need to be assigned splits to process. For any given split, the set of nodes P and set of live workers Q may be overlapping. The nodes which overlap will have the split local to their disk. When there is no overlap, the worker will have to access the split from a remote file system node.

Following steps (208) and (210), it is determined if there are any unassigned splits (212). A negative response to this determination concludes the split assignment process to system nodes. However, a positive response is followed by an equitable split assignment process. For each node designated to receive the assigned split (214), a value of the node is determined, with the value based on the linear regression model and the new split assignment (216). In one embodiment, the value determined at step (216) is associated with a predicted load corresponding to a new assignment of one or more unassigned blocks. The value for the node is compared with the control factor (218). In one embodiment, the value for the node is compared with the global bound, which acts as a load balancing factor or constraint. In one embodiment, for a given value of the global bound, as many local and remote splits assignments as possible takes place per loop iteration without violating the global bound. When no further assignments under the current global bound are possible, the value of the global bound is increased by the value of the delta bound, and the assignment process continues until all splits are assigned. As demonstrated, a positive response to the determination at step (218) is followed by assignment of the splits to the nodes (220) and then followed by a return to step (212), and a negative response to the determination at step (220) is followed by an adjustment of the control factor (224) and a return to step (218).

As demonstrated, the split assignment loop ensures that splits are equitably distributed among the nodes. In other words, nodes are not subject to "overload" by the new assignment, based on the bound set by the control factor. Accordingly, the control factor is selectively adjusted after each circuit to ensure that each unassigned block of the new assignment is assigned to a node.

As can be seen above, the value of the control factor affects the number of assignment circuits. For instance, the higher the adjustment value, the fewer number of assignment circuits that will need be performed to assign the entire new assignment, while a lower adjustment will enable additional assignment circuits. At the same time, the adjustment value is inversely proportional to the quality of the load balance among the nodes. As shown, a higher adjustment value is associated with a faster, but less optimized assignment, and a lower adjustment value is associated with a slower, but more optimized assignment. Accordingly, the control factor imposes a balance between speed and quality during the assignment process.

If given more time, the split assignment process of FIG. 2 may be dynamically configured to aggressively optimize assignment quality, locality, and load balance. When operating under a time constraint, the selective assignment process may be dynamically configured to sacrifice quality, locality, and load balance for speed.

Figure 4:
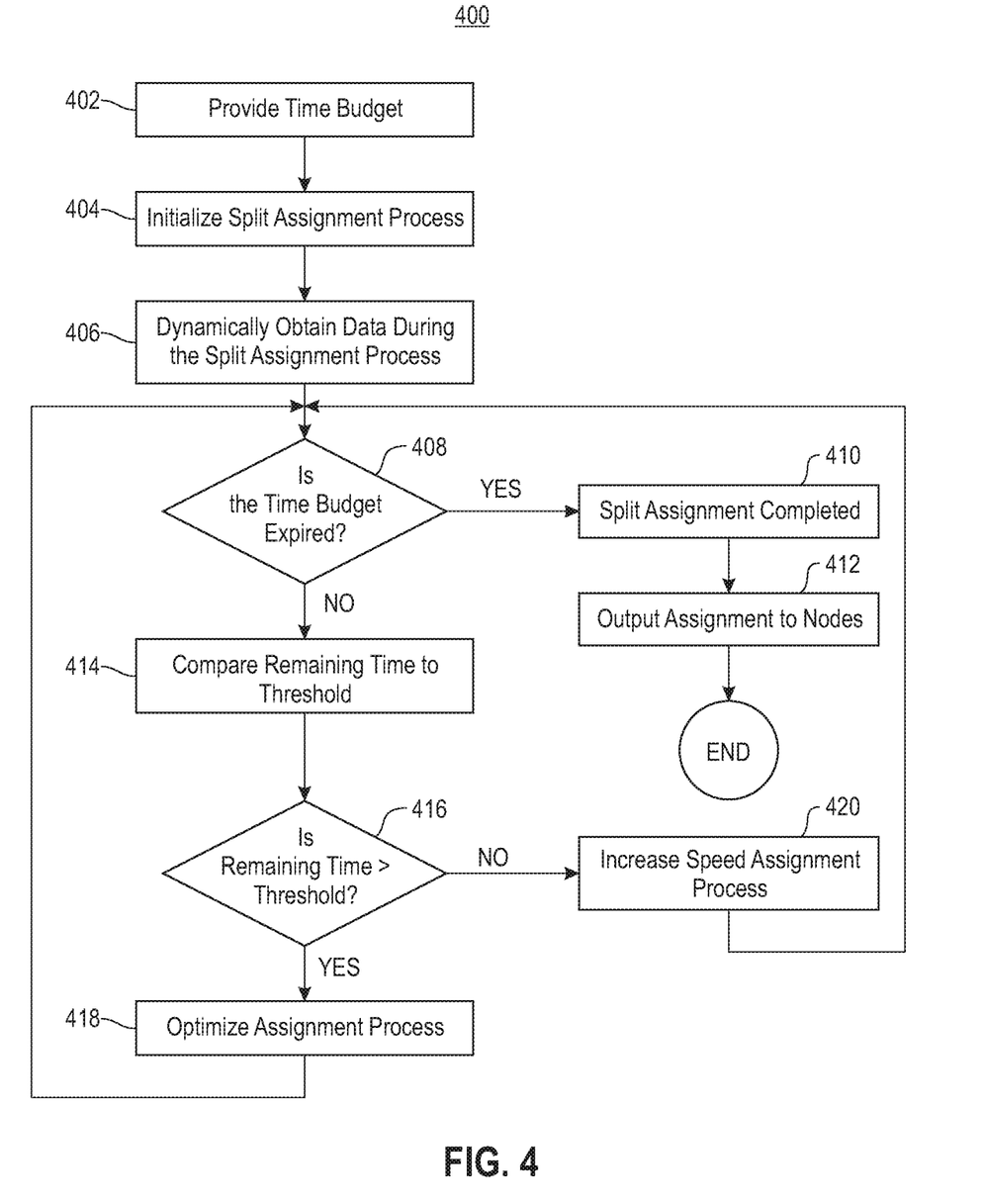
FIG. 4 depicts a flow chart illustrating a process for implementing a time budget to dynamically configure the assignment process of FIG. 2.

With reference to FIG. 4, a flow chart (400) is provided illustrating a process for dynamically configuring a split assignment process by implementing a time budget as a factor in the process. The notion of a time budget is an optimization to the basic split assignment algorithm. The idea is that if we are given a certain time budget, for example there is a requirement that all assignments must be done in 30 seconds or less, then 30 seconds is our time budget. During the course of split assignment, we can define a threshold, e.g. 10 seconds. If "time budget MINUS time spent so far <10 seconds", then it means we still have time to do optimized assignment. If that is not the case, we need to finish assignment as quickly as possible, and hence it may not be optimal. As shown in FIG. 4, a time budget is provided (402). The time budget is a maximum time allotted for the split assignment process to be performed. A split assignment process is initialized (404), and data associated with the assignment process is dynamically obtained during the split assignment process (406). In one embodiment, the data obtained at step (406) includes a current amount of time spent performing the assignment process. Prior to outputting the assignment to worker nodes, it is determined if the time budget has expired (408). An affirmative response to the determination at step (408) indicates that no more time may be allotted to the split assignment process, and the assignment process is completed (410). In one embodiment, step (410) includes outputting the assignment to the corresponding nodes (412). However, a non-affirmative response to the determination at step (408) causes the process to compare a remaining amount of time to a threshold amount of time (414), and, in one embodiment, the remaining amount of time is the difference between the time budget and the current amount of time spent. Following step (412), it is determined if the remaining amount of time is greater than the threshold (416). An affirmative response to the determination at step (416) indicates that the process has sufficient time remaining to focus on optimization, and the split assignment process is optimized (418). In one embodiment, the optimization at step (418) includes reducing the size of the control factor adjustment value, as discussed above in FIG. 2. A non-affirmative response to the determination at step (416) indicates that speed is a priority for completion of the assignment process, and the speed of the split assignment process is increased (420). In one embodiment, increasing the speed of the split assignment process at step (420) includes increasing the size of the control factor adjustment value, as discussed above in FIG. 2. Following either step (418) or (420), the process proceeds to step (408) to determine if the time budget has expired. Accordingly, the parameters of the split assignment process of FIG. 2 may be dynamically modified based in part on time considerations.

Figure 5:
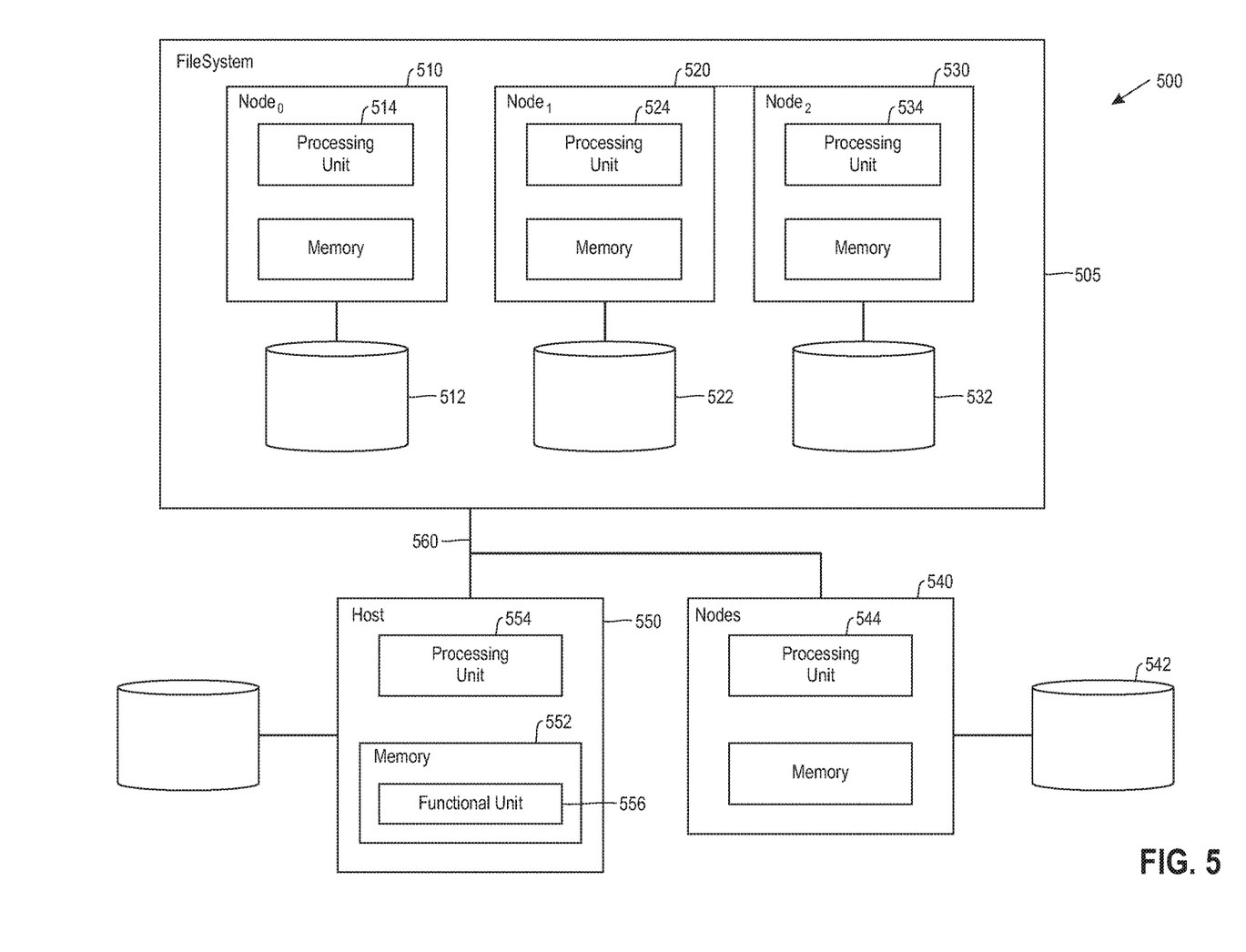
FIG. 5 depicts a schematic example of a distributed file system having a plurality of nodes.

With reference to FIG. 5, a block diagram (500) is provided illustrating an exemplary file system (505). In one embodiment, the file system (505) is a distributed file system. The file system (505) is shown including a host (550) in communication with the plurality of nodes (510), (520), (530), and (540). It is to be understood that the number of nodes depicted is not intended to be limiting, and it is to be appreciated that any number of nodes may be implemented in a distributed file system in accordance with the embodiments described herein.

In one embodiment, nodes (510)-(530) are local nodes of the file system (505), and node (540) is remote to the locality of both the host (550) and nodes (510)-(530). As shown, node (510) includes local persistent storage (512) and local processing unit (514); node (520) includes local persistent storage (522) and local processing unit (524); and node (530) includes local persistent storage (532) and local processing unit (534). Each processing unit may be referred to as a worker of its respective node. Node (540) includes local persistent storage (542) and processing unit (544). However Node (540) is remote from nodes (510)-(530) and from the host (550). In one embodiment, node (540) communicates with the host (550) over a network (560).

The host (550) includes host memory (552), a host processing unit (554), and a functional unit (556). The functional unit (556) may include one or more tools to perform the processes of FIGS. 2-4. For example, in one embodiment, the functional unit (556) is configured to transmit split assignments to the nodes (510)-(540), as described above with reference to FIGS. 2-4. Each processing unit, also referred to herein as a worker, (514), (524), (534), and (544) is configured to process its respective split assignment. Further details with respect to the host (550) will be provided below in FIG. 6.

Figure 6:
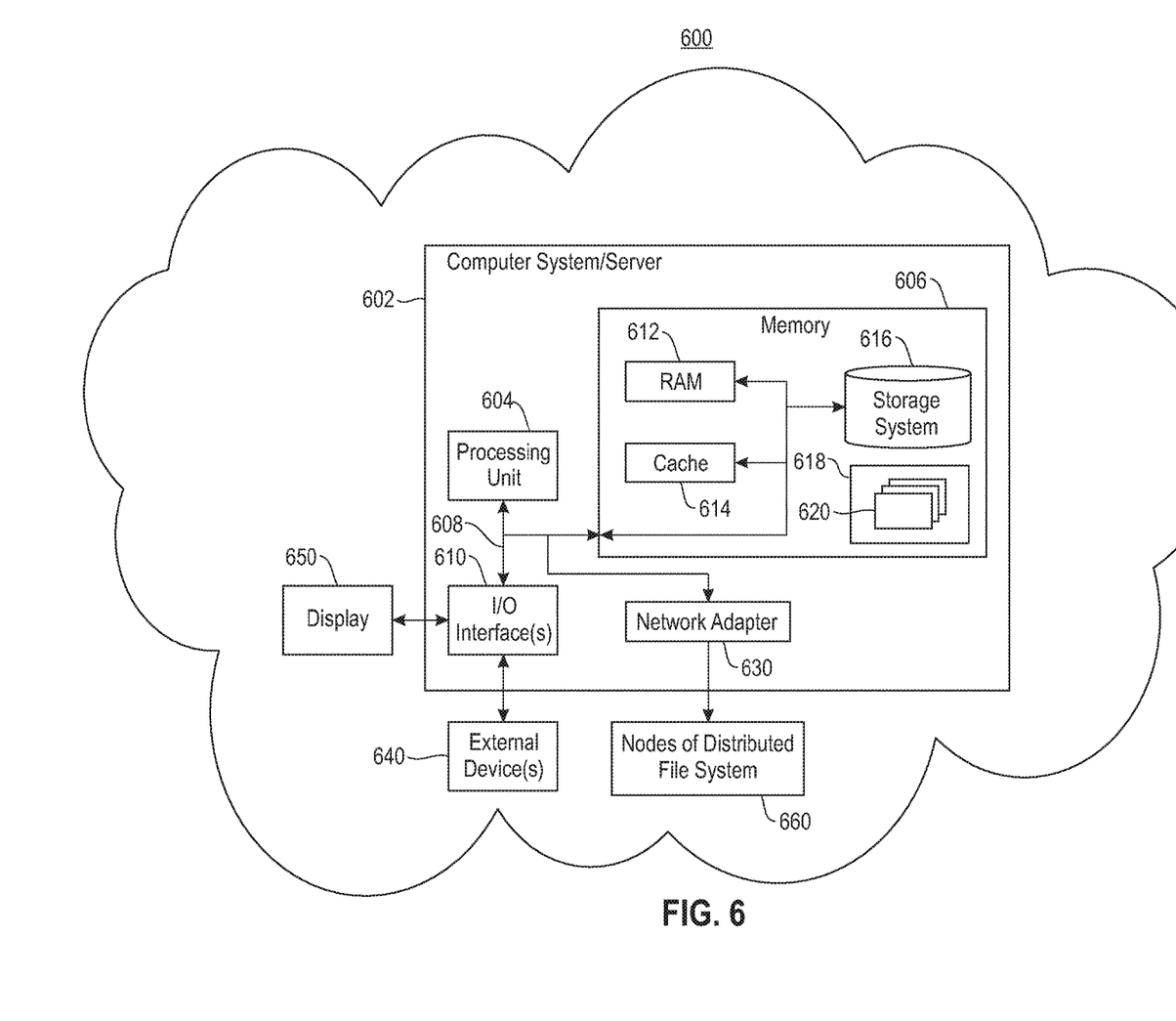
FIG. 6 depicts a schematic example of a system to implement the processes of FIGS. 2-4.

With reference to FIG. 6, a block diagram (600) is provided illustrating an example of a computer system/server (602), hereinafter referred to as a host (602), to implement the processes described above with respect to FIGS. 1-4. Host (602) is operational with numerous other general purpose or special purpose computing system environments or configurations. Examples of well-known computing systems, environments, and/or configurations that may be suitable for use with host (602) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems or devices, and the like.

Host (602) may be described in the general context of computer system-executable instructions, such as program modules, being executed by a computer system. Generally, program modules may include routines, programs, objects, components, logic, data structures, and so on that perform particular tasks or implement particular abstract data types. Host (602) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, host (602) is shown in the form of a general-purpose computing device. The components of host (602) may include, but are not limited to, one or more processors or processing units (604), a system memory (606), and a bus (608) that couples various system components including system memory (606) to processor (604). Bus (608) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (602) typically includes a variety of computer system readable media. Such media may be any available media that is accessible by host (602) and it includes both volatile and non-volatile media, removable and non-removable media.

Memory (606) can include computer system readable media in the form of volatile memory, such as random access memory (RAM) (612) and/or cache memory (614). Host (602) further includes other removable/non-removable, volatile/non-volatile computer system storage media. By way of example only, storage system (616) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (608) by one or more data media interfaces.

Program/utility (618), having a set (at least one) of program modules (620), may be stored in memory (606) by way of example, and not limitation, as well as an operating system, one or more application programs, other program modules, and program data. Each of the operating systems, one or more application programs, other program modules, and program data or some combination thereof, may include an implementation of a networking environment. Program modules (620) generally carry out the functions and/or methodologies of embodiments as described herein. For example, the set of program modules (620) may include at least one module that is configured to implement the split assignment processes described above with reference to FIGS. 1-4.

Host (602) may also communicate with one or more external devices (640), such as a keyboard, a pointing device, etc.; a display (650); one or more devices that enable a user to interact with host (602); and/or any devices (e.g., network card, modem, etc.) that enable host (602) to communicate with one or more other computing devices. Such communication can occur via Input/Output (I/O) interface(s) (610). Still yet, host (602) can communicate with one or more networks such as a local area network (LAN), a general wide area network (WAN), and/or a public network (e.g., the Internet) via network adapter (630). As depicted, network adapter (630) communicates with the other components of host (602) via bus (608). In one embodiment, a plurality of nodes of a distributed file system (660), such as the nodes described above in FIG. 5, are in communication with the host (602) via the I/O interface (610) or via the network adapter (630). It should be understood that although not shown, other hardware and/or software components could be used in conjunction with host (602). Examples, include, but are not limited to: microcode, device drivers, redundant processing units, external disk drive arrays, RAID systems, tape drives, and data archival storage systems, etc.

In one embodiment, host (602) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 7:
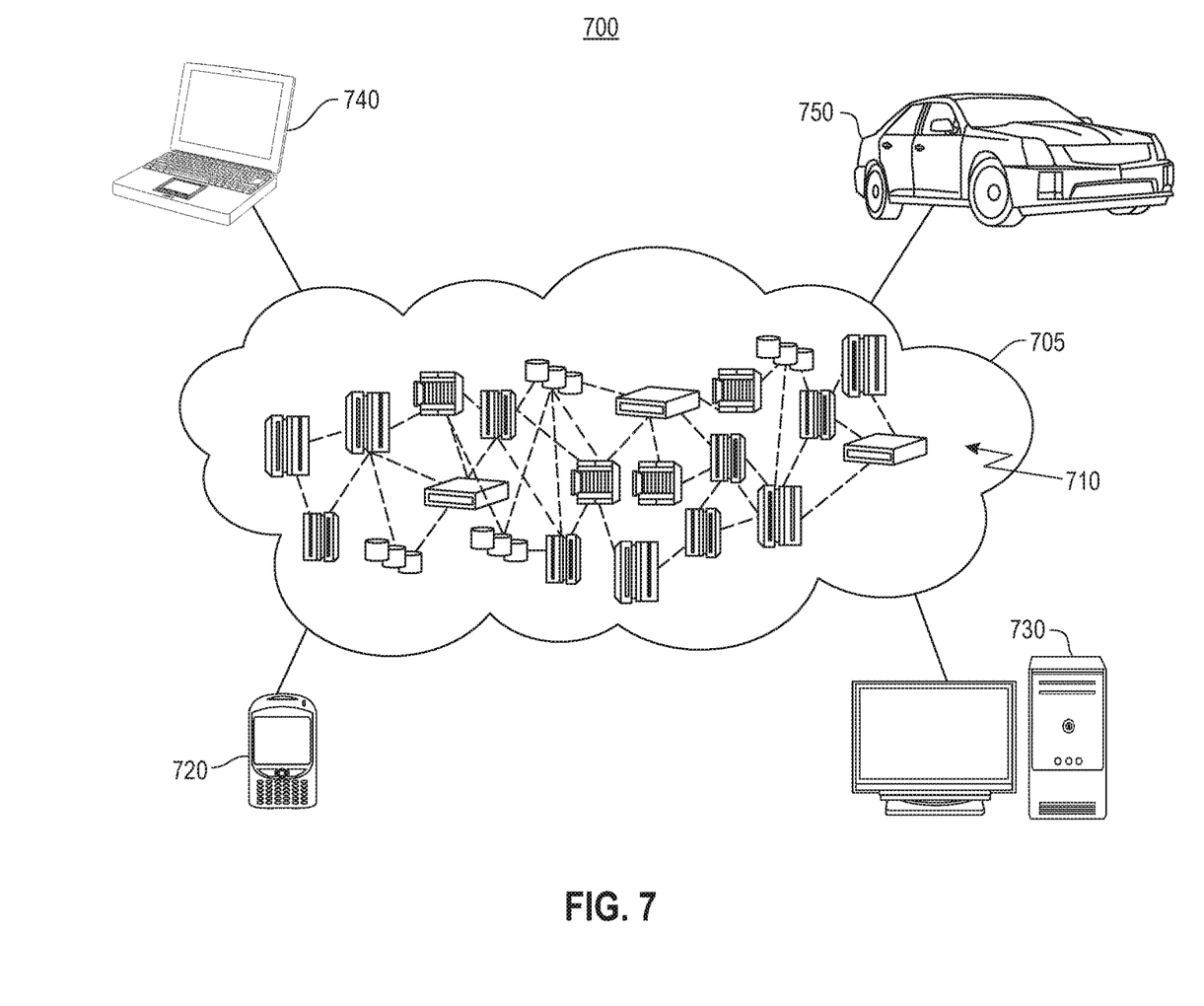
FIG. 7 depicts a block diagram illustrative of a cloud computing environment.

Referring now to FIG. 7, an illustrative cloud computing network (700). As shown, cloud computing network (700) includes a cloud computing environment (705) having one or more cloud computing nodes (710) with which local computing devices used by cloud consumers may communicate. Examples of these local computing devices include, but are not limited to, personal digital assistant (PDA) or cellular telephone (720), desktop computer (730), laptop computer (740), and/or automobile computer system (750). Individual nodes within nodes (710) may further communicate with one another. They may be grouped (not shown) physically or virtually, in one or more networks, such as Private, Community, Public, or Hybrid clouds as described hereinabove, or a combination thereof. This allows cloud computing environment (700) to offer infrastructure, platforms and/or software as services for which a cloud consumer does not need to maintain resources on a local computing device. It is understood that the types of computing devices (720)-(750) shown in FIG. 7 are intended to be illustrative only and that the cloud computing environment (705) can communicate with any type of computerized device over any type of network and/or network addressable connection (e.g., using a web browser).

Figure 8:
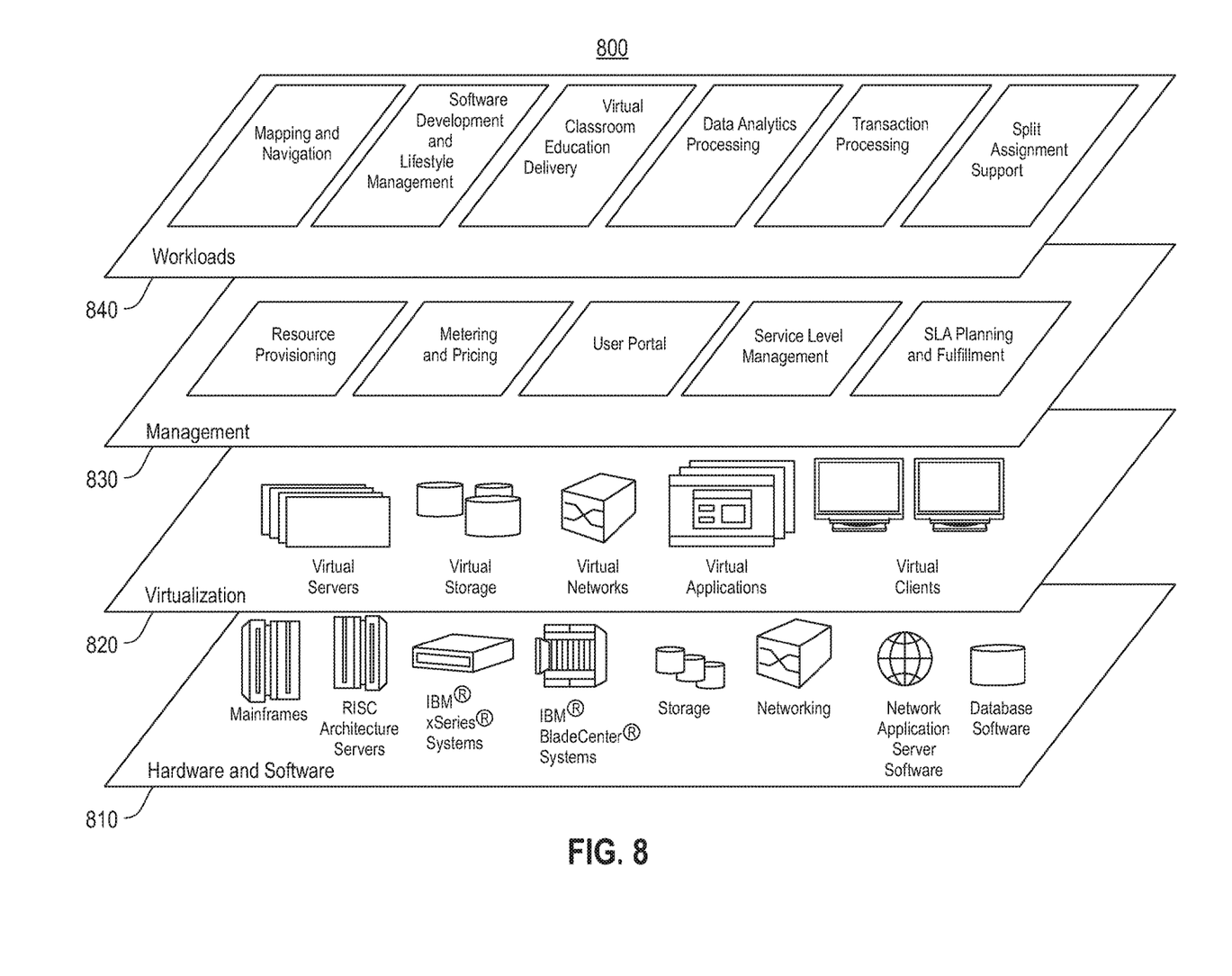
FIG. 8 depicts a block diagram illustrating a set of functional abstraction model layers provided by the cloud computing environment.

Referring now to FIG. 8, a set of functional abstraction layers provided by the cloud computing network of FIG. 7 is shown. It should be understood in advance that the components, layers, and functions shown in FIG. 8 are intended to be illustrative only, and the embodiments are not limited thereto. As depicted, the following layers and corresponding functions are provided: hardware and software layer (810), virtualization layer (820), management layer (830), and workload layer (840). The hardware and software layer (810) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (820) provides an abstraction layer from which the following examples of virtual entities may be provided: virtual servers; virtual storage; virtual networks, including virtual private networks; virtual applications and operating systems; and virtual clients.

In one example, management layer (830) may provide the following functions: resource provisioning, metering and pricing, user portal, service level management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer (840) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and split assignment support within the cloud computing environment.

In the shared pool of configurable computer resources described herein, hereinafter referred to as a cloud computing environment, files may be shared among users within multiple data centers, also referred to herein as data sites. A series of mechanisms are provided within the shared pool to provide decision making controls for access to one or more records based upon associated record access and inherent characteristics of privacy. Three knowledge bases are employed with respect to consent management, including importance, sensitivity, and relevance. Analytical techniques employ the knowledge bases to assist with making access control decisions.

As will be appreciated by one skilled in the art, the aspects may be embodied as a system, method, or computer program product. Accordingly, the aspects may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the aspects described herein may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for the embodiments described herein may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The embodiments are described above with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow chart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus, provide processes for implementing the functions/acts specified in the flow chart and/or block diagram block or blocks.

The flow charts and block diagrams in the Figures illustrate the architecture, functionality, and operation of possible implementations of systems, methods, and computer program products according to various embodiments. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration(s), and combinations of blocks in the block diagrams and/or flow chart illustration(s), can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The embodiments described herein may be implemented in a system, a method, and/or a computer program product. The computer program product may include a computer readable storage medium (or media) having computer readable program instructions thereon for causing a processor to carry out the embodiments described herein.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmissions, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The embodiments are described herein with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

The corresponding structures, materials, acts, and equivalents of all means or step plus function elements in the claims below are intended to include any structure, material, or act for performing the function in combination with other claimed elements as specifically claimed. The description of the embodiments herein has been presented for purposes of illustration and description, but is not intended to be exhaustive or limited to the embodiments in the forms disclosed. Many modifications and variations will be apparent to those of ordinary skill in the art without departing from the scope and spirit of the embodiments described herein. The embodiments were chosen and described in order to best explain the principles and the practical application, and to enable others of ordinary skill in the art to understand the various embodiments with various modifications as are suited to the particular use contemplated.

It will be appreciated that, although specific embodiments have been described herein for purposes of illustration, various modifications may be made without departing from the spirit and scope of the specific embodiments described herein. Accordingly, the scope of protection is limited only by the following claims and their equivalents.

What is claimed is:

1. A method comprising:
assigning an initial batch of blocks of data to one or more nodes of a file system;
performing a first assignment circuit, including selectively assigning one or more unassigned blocks to the one or more nodes, the selective assignment comprising:
constructing a linear regression model based on node data; and
for each node, determining a value based on the linear regression model, wherein each value is associated with a predicted load corresponding to the selective assignment of the one or more unassigned blocks; and
in response to determining the predicted load is less than a control factor associated with the selective assignment, assigning the one or more unassigned blocks to the one or more nodes;
selectively adjusting the control factor, the adjustment in response to determining that the predicted load for the one or more nodes exceed the control factor; and
performing a second assignment circuit, including selectively assigning the one or more unassigned blocks to the one or more nodes exceeding the control factor based on the selectively adjusted control factor.

2. The method of claim 1, wherein constructing the linear regression model comprises:
initializing the linear regression model based on a set of initial values associated with predicted costs;
collecting one or more read metric samples for each of the nodes; and
dynamically refining the linear regression model based on the collected samples.

3. The method of claim 1, further comprising refining the linear regression model with a decay factor, wherein the decay factor governs relativity of weight between past samples and a new sample.

4. The method of claim 1, further comprising controlling operation of the selective assignment based on a threshold associated with a time budget, including comparing a remaining time to the threshold, and selecting a mode of operation of the selective assignment based on the comparison.

5. The method of claim 1, wherein the control factor manages a maximum permitted load per node.

6. The method of claim 5, wherein the selective assignment of the one or more unassigned blocks further comprises:
comparing a first predicted value associated with a first node to the control factor;
in response to determining that the predicted value associated with the first node is less than the control factor, assigning a new assignment to the first node; and
in response to determining that the predicted value associated with the first node exceeds the control factor, comparing a second predicted value associated with a second node to the control factor to determine if the new assignment is assignable to the second node.

7. A computer program product comprising a computer readable hardware storage device having program code embodied therewith, the program code executable by a processing unit to:
assign an initial batch of blocks of data to one or more nodes of a file system;
perform a first assignment circuit, including selectively assign one or more unassigned blocks to the one or more nodes, the selective assignment comprising:
construct a linear regression model based on node data; and
for each node, determine a value based on the linear regression model, wherein each value is associated with a predicted load corresponding to the selective assignment of the one or more unassigned blocks; and
in response to determining the predicted load is less than a control factor associated with the selective assignment, assign the one or more unassigned blocks to the one or more nodes;
selectively adjust the control factor, the adjustment in response to determining that the predicted load for the one or more nodes exceed the control factor; and
perform a second assignment circuit, including selectively assign the one or more unassigned blocks to the one or more nodes exceeding the control factor based on the selectively adjusted control factor.

8. The computer program product of claim 7, wherein the program code to construct the linear regression model comprises instructions configured to:
initialize the linear regression model based on a set of initial values associated with predicted costs;
collect one or more read metric samples for each of the nodes; and
dynamically refine the linear regression model based on the collected samples.

9. The computer program product of claim 7, further comprising program code configured to refine the linear regression model with a decay factor, wherein the decay factor governs relativity of weight between past samples and a new sample.

10. The computer program product of claim 7, further comprising program code configured to control operation of the selective assignment based on a threshold associated with a time budget, including compare a remaining time to the threshold, and select a mode of operation of the selective assignment based on the comparison.

11. The computer program product of claim 7, wherein the control factor manages a maximum permitted load per node.

12. The computer program product of claim 11, wherein the selective assignment of the one or more unassigned blocks further comprises program code configured to:
compare a first predicted value associated with a first node to the control factor;
in response to determining that the predicted value associated with the first node is less than the control factor, assign a new assignment to the first node; and
in response to determining that the predicted value associated with the first node exceeds the control factor, compare a second predicted value associated with a second node to the control factor to determine if the new assignment is assignable to the second node.

13. A system comprising:
a processing unit in communication with memory;
a plurality of nodes operatively coupled to the processing unit, each node having local persistent storage and a local processor; and
a tool in communication with the nodes, the tool configured to:
assign an initial batch of blocks of data to one or more nodes of a file system;

perform a first assignment circuit, including selectively assign one or more unassigned blocks to the one or more nodes, the selective assignment comprising the tool to:
construct a linear regression model based on node data; and
for each node, determine a value based on the linear regression model, wherein each value is associated with a predicted load corresponding to the selective assignment of the one or more unassigned blocks; and
in response to determining the predicted load is less than a control factor associated with the selective assignment, assign the one or more unassigned blocks to the one or more nodes;
selectively adjust the control factor, the adjustment in response to determining that the predicted load for the one or more nodes exceed the control factor; and
perform a second assignment circuit, including selectively assigning the one or more unassigned blocks to the one or more nodes exceeding the control factor based on the selectively adjusted control factor.

14. The system of claim 13, wherein construction of the linear regression model comprises the tool to:
initialize the linear regression model based on a set of initial values associated with predicted costs;
collect one or more read metric samples for each of the nodes; and
dynamically refine the linear regression model based on the collected samples.

15. The system of claim 13, further comprising the tool to refine the linear regression model with a decay factor, wherein the decay factor governs relativity of weight between past samples and a new sample.

16. The system of claim 13, further comprising the tool to control operation of the selective assignment based on a threshold associated with a time budget, including compare a remaining time to the threshold, and select a mode of operation of the selective assignment based on the comparison.

17. The system of claim 13, wherein the control factor manages a maximum permitted load per node.

18. The system of claim 17, wherein the selective assignment of the one or more unassigned blocks further comprises the tool to:
compare a first predicted value associated with a first node to the control factor;
in response to determining that the predicted value associated with the first node is less than the control factor, assign a new assignment to the first node; and
in response to determining that the predicted value associated with the first node exceeds the control factor, compare a second predicted value associated with a second node to the control factor to determine if the new assignment is assignable to the second node.

* * * * *